(12) United States Patent
Gavriel et al.

(10) Patent No.: US 9,965,450 B2
(45) Date of Patent: May 8, 2018

(54) DYNAMIC MANAGEMENT OF SITE COMPONENTS

(71) Applicants: Nati Gavriel, Beer Yaacov (IL); Nissim Tal, Hod HaSharon (IL); Vladimir Tkach, Kfar Yona (IL); Rachel Ebner, Ra'anana (IL)

(72) Inventors: Nati Gavriel, Beer Yaacov (IL); Nissim Tal, Hod HaSharon (IL); Vladimir Tkach, Kfar Yona (IL); Rachel Ebner, Ra'anana (IL)

(73) Assignee: SAP PORTALS ISRAEL LTD., Ra'anana (IL)

( * ) Notice: Subject to any disclaimer, the term of this patent is extended or adjusted under 35 U.S.C. 154(b) by 572 days.

(21) Appl. No.: 14/587,423

(22) Filed: Dec. 31, 2014

(65) Prior Publication Data
US 2016/0188546 A1   Jun. 30, 2016

(51) Int. Cl.
G06F 3/00 (2006.01)
G06F 17/22 (2006.01)
G06F 3/0484 (2013.01)
G06F 17/24 (2006.01)
G06F 17/21 (2006.01)

(52) U.S. Cl.
CPC ...... G06F 17/2247 (2013.01); G06F 3/04847 (2013.01); G06F 17/211 (2013.01); G06F 17/24 (2013.01)

(58) Field of Classification Search
CPC .............. G06F 17/2247; G06F 17/211; G06F 17/3089; G06F 3/04847
See application file for complete search history.

(56) References Cited

U.S. PATENT DOCUMENTS

| | | | | | |
|---|---|---|---|---|---|
| 5,724,595 | A | * | 3/1998 | Gentner | G06F 17/30882 707/E17.013 |
| 5,911,145 | A | * | 6/1999 | Arora | G06F 17/21 707/E17.013 |
| 6,189,019 | B1 | * | 2/2001 | Blumer | G06F 17/30873 707/999.102 |
| 7,392,510 | B1 | * | 6/2008 | Treder | G06F 17/3089 709/224 |
| 7,444,597 | B2 | * | 10/2008 | Perantatos | G06F 3/0486 707/E17.116 |

(Continued)

OTHER PUBLICATIONS

Jessica Mantaro, "FrontPage 2003: The Missing Manual," Aug. 18, 2005, O'Reilly Media, Inc., Chapter 10.*

(Continued)

*Primary Examiner* — Dino Kujundzic
(74) *Attorney, Agent, or Firm* — Buckley, Maschoff & Talwalkar LLC

(57) ABSTRACT

Some aspects include display, in a first region of a first graphical interface, of a graphical representation of a first page of a website, the graphical representation of the first page of the website including a graphical representation of a first page component, display, in a second region of the first graphical interface, of a graphical representation of a second page of the website, the graphical representation of the second page of the website including a graphical representation of a second page component, and display of a graphical indication of a navigation link between the first page component and the second page component.

23 Claims, 11 Drawing Sheets

(56) References Cited

U.S. PATENT DOCUMENTS

| | | | | |
|---|---|---|---|---|
| 7,543,267 B2* | 6/2009 | Lindhorst | ............... | G06F 8/34 |
| | | | | 715/967 |
| 7,984,389 B2* | 7/2011 | Rusu | ................. | G06F 3/0481 |
| | | | | 715/850 |
| 2005/0132329 A1* | 6/2005 | Suwanda | ........ | G06F 17/30896 |
| | | | | 717/120 |
| 2005/0289454 A1* | 12/2005 | Donelson | ........... | G06F 17/3089 |
| | | | | 715/229 |
| 2008/0109472 A1* | 5/2008 | Underwood | ........ | G06F 17/3089 |
| 2009/0013244 A1* | 1/2009 | Cudich | ............... | G06F 17/241 |
| | | | | 715/234 |
| 2012/0054648 A1* | 3/2012 | Morris | ................ | G06F 3/0481 |
| | | | | 715/764 |
| 2012/0290959 A1* | 11/2012 | Quine | .................... | G06F 8/34 |
| | | | | 715/765 |
| 2013/0238977 A1* | 9/2013 | Abrahami | ........... | G06F 17/3089 |
| | | | | 715/234 |

OTHER PUBLICATIONS

Brian Clifton, "Advanced Web Metrics with Google Analytics," 2012, John Wiley & Sons, Inc., 3rd Edition, "Identify and Optimize Poor-Performing Pages" section of Chapter 11.*

* cited by examiner

118

| Component | Timestamp | Ranking | Usage Count | Navigation Links | Subscriptions |
|---|---|---|---|---|---|
|  |  |  |  |  |  |
|  |  |  |  |  |  |
|  |  |  |  |  |  |
|  |  |  |  |  |  |

*FIG. 2*

DYNAMIC MANAGEMENT OF SITE COMPONENTS

BACKGROUND

Web-based applications provide Web clients with a point of entry to backend applications, servers and/or services. These applications provide Web pages to Web clients based on Web technologies and protocols (e.g., HyperText Transfer Protocol, Java, etc.). User interface (UI) frameworks have been developed to facilitate development of such Web-based applications. These frameworks provide code libraries and messaging protocols which a developer may leverage to develop Web applications.

Using conventional development tools, it is difficult to manage the layout of Web pages and of the pages' constituent components (e.g., widgets, etc.). Moreover, systems are desired for improved visualization and management of the relationships, connections, usage data, rankings and/or other metadata of the pages and components.

BRIEF DESCRIPTION OF THE DRAWINGS

FIG. 2 is a graphical representation of a portion of a database table according to some embodiments.

DETAILED DESCRIPTION

Figure 1:
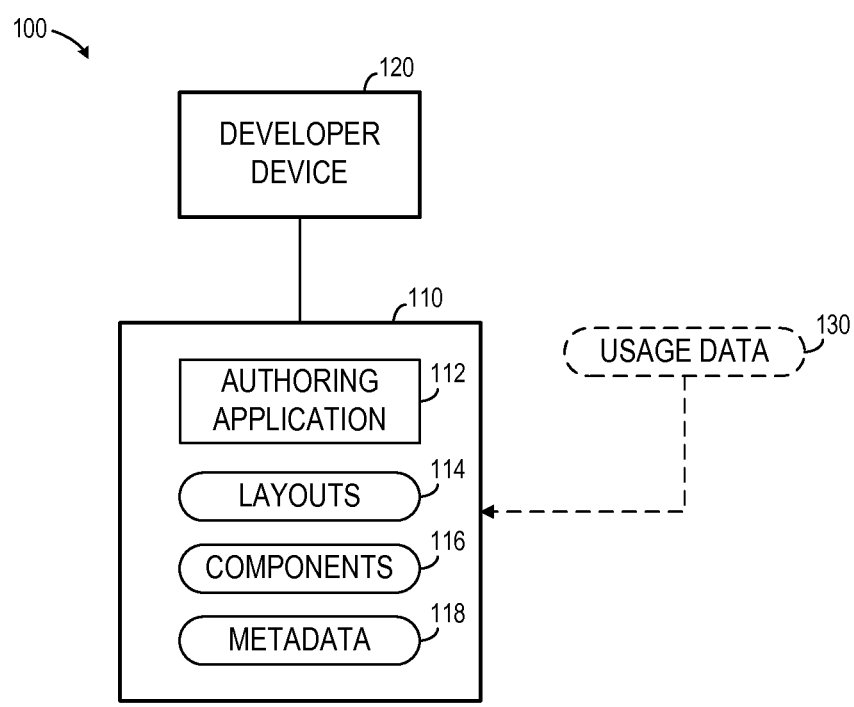
FIG. 1 is a block diagram of a system according to some embodiments.

FIG. 1 is a block diagram of development system architecture 100 according to some embodiments. FIG. 1 represents a logical architecture for describing processes according to some embodiments, and actual implementations may include more or different components arranged in other manners.

Any of the depicted elements of architecture 100 may be implemented by one or more hardware devices coupled via any number of public and/or private networks. Two or more of such devices may be located remote from one another, and all devices may communicate with one another via any known manner of network(s) and/or via a dedicated connection.

Architecture 100 includes development system 110 and developer device 120. Generally, development system 110 provides functionality which allows a developer operating developer device to create and/or manage a website consisting of multiple web pages using a single page application. Development system 110 comprises processor-executable program code of authoring application 112, which may be executed by one or more processors of development system 110 to perform the functions described herein.

Authoring application 112 may comprise a single-page Web application, but embodiments are not limited thereto. In this regard, development system 110 may also comprise a Web server to serve a Web page of authoring application 112 to developer device 120 via a Web browser executed by developer device 120. Development server 110 may also provide server applications accessible by client devices (not shown) which provide data to the client devices from a backend system, such as an enterprise database (not shown). Such an architecture according to some embodiments is described below with respect to FIG. 10.

Development system 110 also includes layouts 114, components 116 and metadata 118. Layouts 114 may include data describing the physical appearance of Web pages of a website. Layouts 114 may specify, for each of several Web pages, locations, sizes and colors of graphical elements, text formatting and location, locations and formatting of constituent components (e.g., widgets, menus, tabs) and other layout-related information.

Components 116 comprise code and or code snippets which provide Web page functionality. Components 116 may comprise reusable entities which may be used by one or more Web pages of a website and/or in multiple websites authored by authoring application 112. A component 116 may, for example, comprise code of a widget to display a list of contacts, code of a widget to display stock prices, code of a tabbed selection window, and/or any other UI element that is or becomes known.

Metadata 118 may comprise data describing relationships, connections, usage data, rankings and/or other metadata of Web pages and components. The usage data and rankings may be provided as usage data 130 by run-time systems or any other source. The data of metadata 118 may facilitate development and management of multi-page websites as will be described below. Generally, metadata 118 may facilitate filtering and/or sorting of pages and components, and may also or alternatively facilitate management of navigation and subscriptions between Web page components.

FIG. 2 is a tabular representation of metadata 118 according to some embodiments. Metadata 118, as shown, associates a component (e.g., via the Component field) with a timestamp, a ranking, a usage count, navigation links and subscriptions. Embodiments are not limited to the information and structure illustrated in FIG. 2.

Returning to FIG. 1, developer device 120 may comprise a desktop computer, a laptop computer, a netbook computer, a tablet computer, a smartphone, and/or any other computing system that is or becomes known. Developer device 120 may include a memory storing program code of a client application such as a Web browser and a processor to execute the code in order to interact with authoring application 112 and present user interfaces as described herein.

Figure 3:
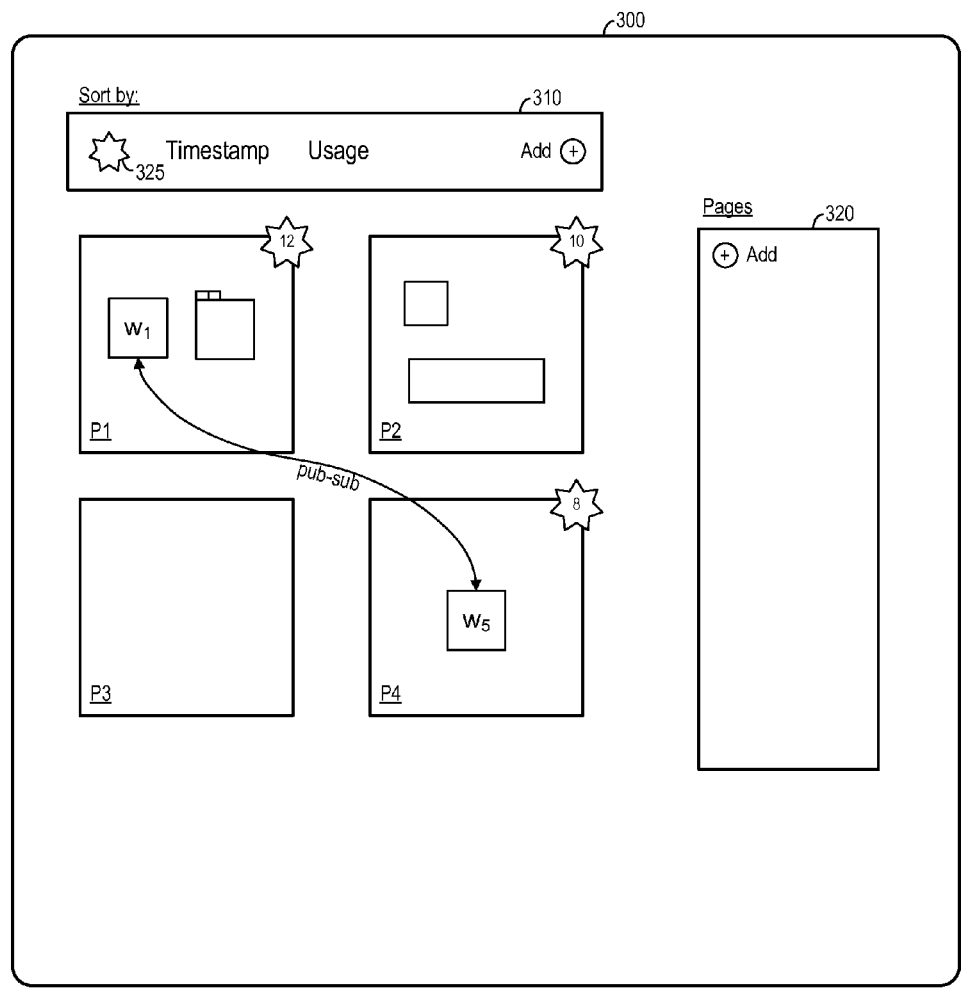
FIG. 3 is a view of a user interface of an authoring application according to some embodiments.

FIG. 3 illustrates user interface 300 according to some embodiments. Developer device 120 may execute program code of a Web browser to display user interface 300 on a display device according to some embodiments. More specifically, developer device 120 executes program code of a Web browser and enters a Uniform Resource Locator (URL) corresponding to authoring application 112 of system 110. In response, system 110 provides a Web document to developer device 120. Developer device 120 parses the Web document and executes any code (e.g., Java) therein to generate and display interface 300.

Interface 300 illustrates a single-page application which facilitates the development and management of multiple pages of a website simultaneously. According to the illustrated embodiment, interface 300 presents representations of four Web pages P1-P4. The representations indicate the layout and components of each page as well as the navigation links and data dependencies therebetween.

Interface 300 includes Sort management area 310 and Pages management area 320. Sort management area 310 includes icons/text which are selectable to sort the depicted pages P1-P4 based on the characteristic denoted by the selected icon/text. In this regard, star icon 325 indicates a ranking, which may apply to a page or a component within a page.

Interface 300 illustrates a subscription established between widget $w_1$ of page P1 and widget $w_5$ of page P4. Widget $w_1$ and widget $w_5$ need not be identical; they may each operate on some common set of data. The subscription may be uni- or bi-directional, and details thereof may be stored among metadata 118.

Figure 4:
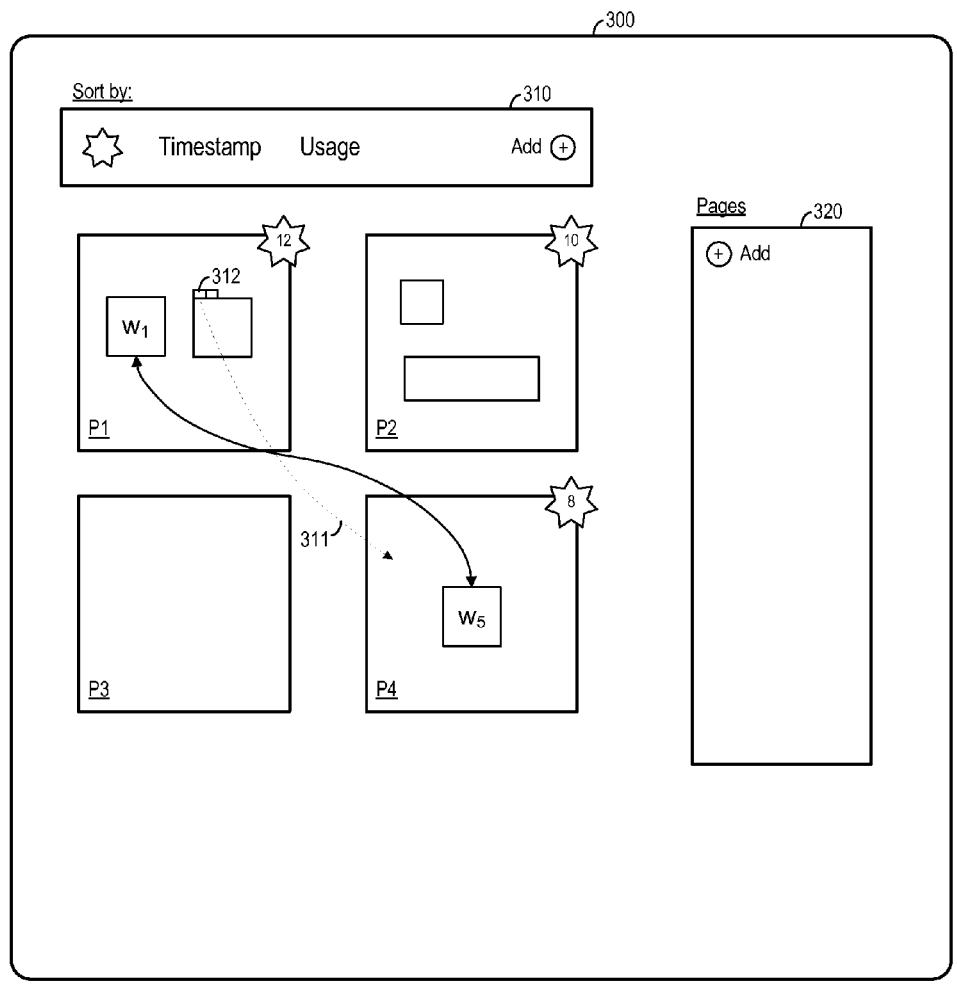
FIG. 4 is a view of a user interface of an authoring application according to some embodiments.

FIG. 4 illustrates creation of navigation link 311 between tab 312 of page P1 and page P4. For example, a developer may use an input device such as a mouse to drag an on-screen pointer from tab 312 to page P4. Such action may create a navigation link in rows of metadata 118 which correspond to tab 312 and to page P4. Accordingly, upon deployment of the finalized website, selection of tab 312 will result in navigation to page P4.

Figure 5:
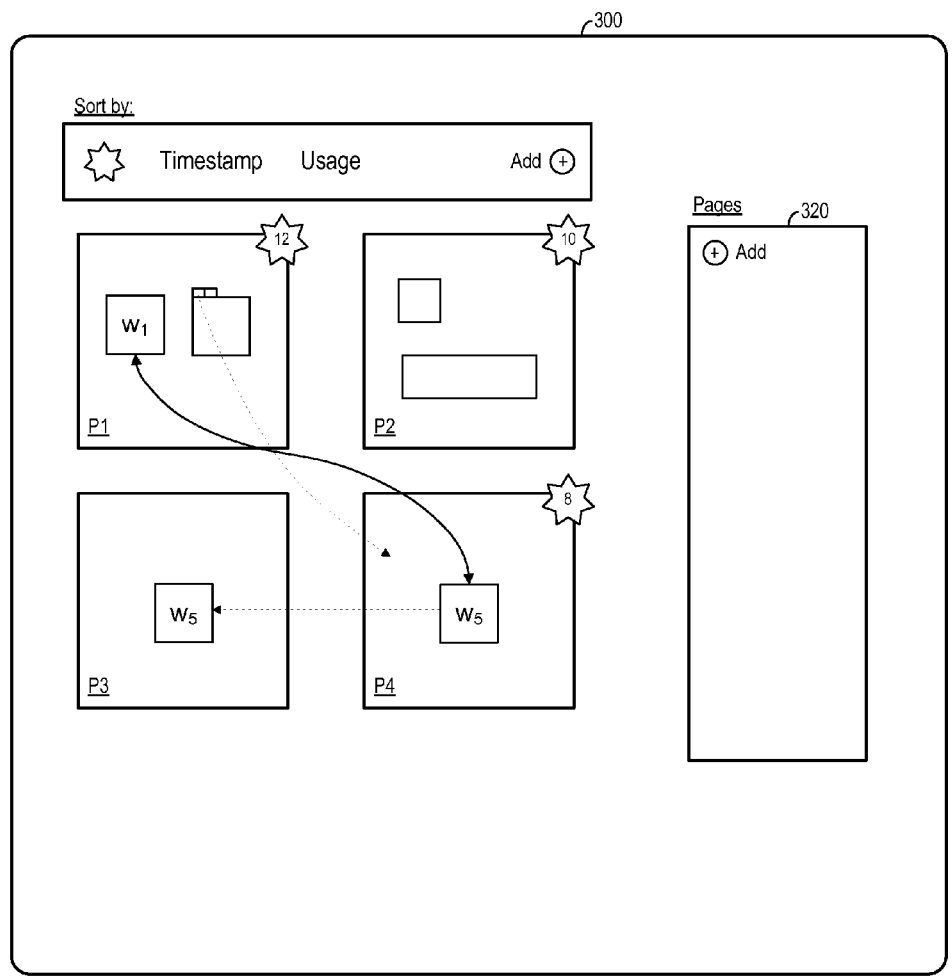
FIG. 5 is a view of a user interface of an authoring application according to some embodiments.

FIG. 5 illustrates copying of widget $w_5$ from page P4 to page P3. According to some embodiments, a user copies a widget by selecting the widget and dragging the widget from one page to a desired location of a second page. The dragging may be accompanied by a keypress to distinguish the copy operation from a "move" operation. Copying may create a subscription between the two instantiations of the copied widget, which is reflected in metadata 118, but embodiments are not limited thereto.

Figure 6:
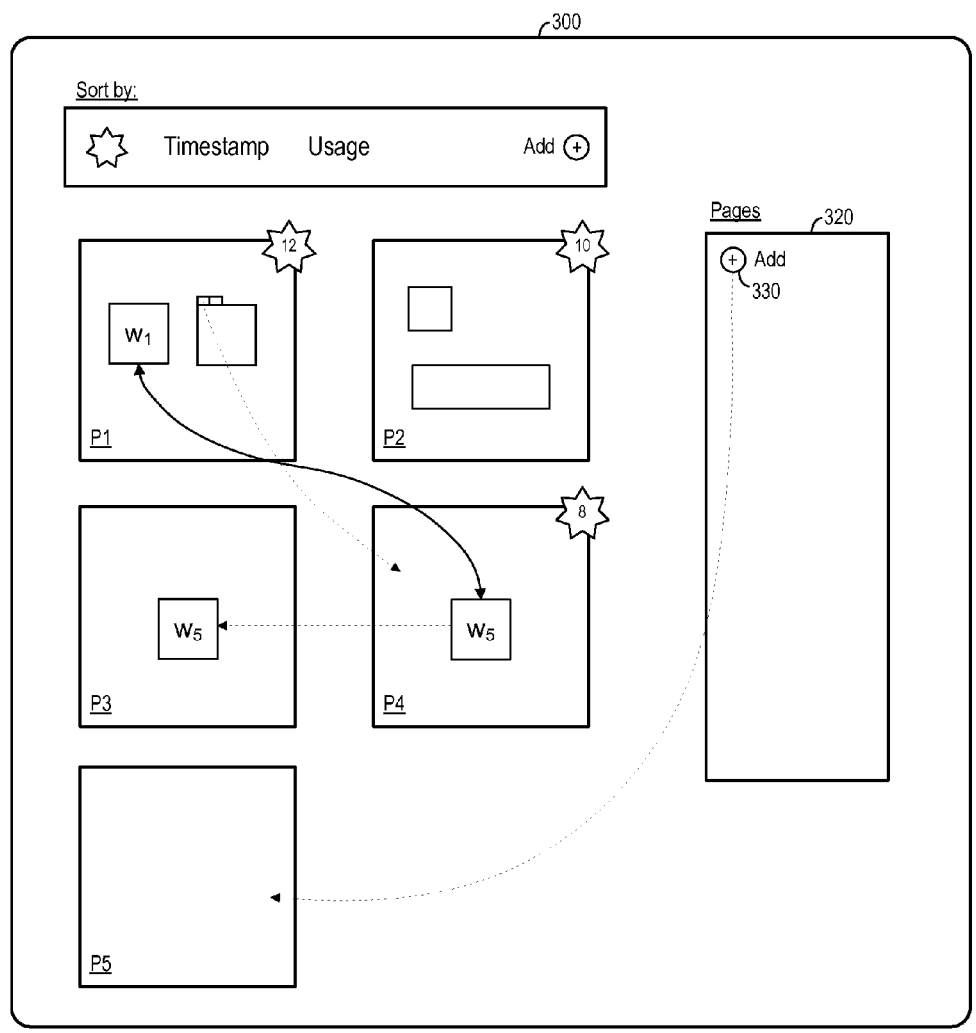
FIG. 6 is a view of a user interface of an authoring application according to some embodiments.

In another example, FIG. 6 illustrates addition of page P5 to the website of interface 300. Specifically, selection of Add icon 330 results in creation of page P5. Once page P5 is created, components may be added thereto as described above, including associated navigation links and/or subscriptions.

Figure 7:
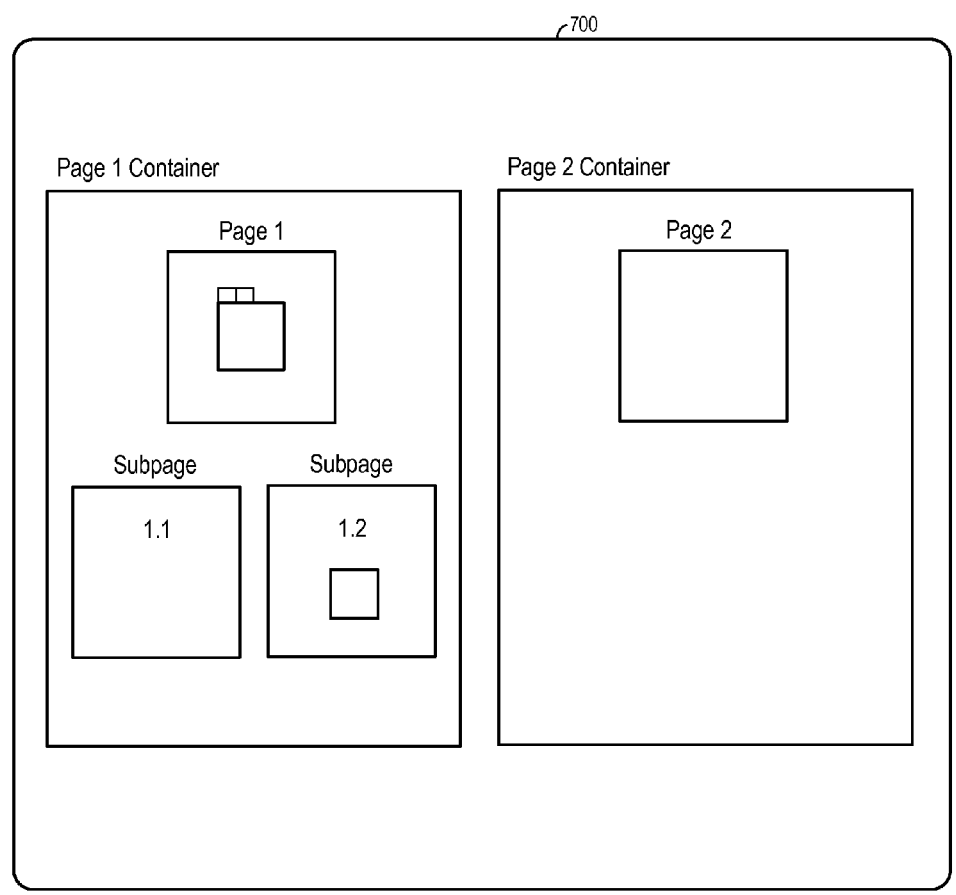
FIG. 7 is a view of a user interface of an authoring application according to some embodiments.

FIG. 7 illustrates interface 700 according to some embodiments. Interface 700 may also be presented by the Web page received from authoring application 112 and rendered by development device 120. As shown, interface 700 includes two containers, each representing a Web page and sub-pages thereof.

The Page 1 container includes a representation of Page 1, including a tabbed component, and representations of sub-pages 1.1 and 1.2. The Page 2 container of FIG. 7 includes a represenatation of Page 2. According to some embodiments, the components and pages of the Page 1 and Page 2 containers may be manipulated as described above with respect to FIGS. 3-6, with such manipulations reflected in corresponding metadata.

Figure 8:
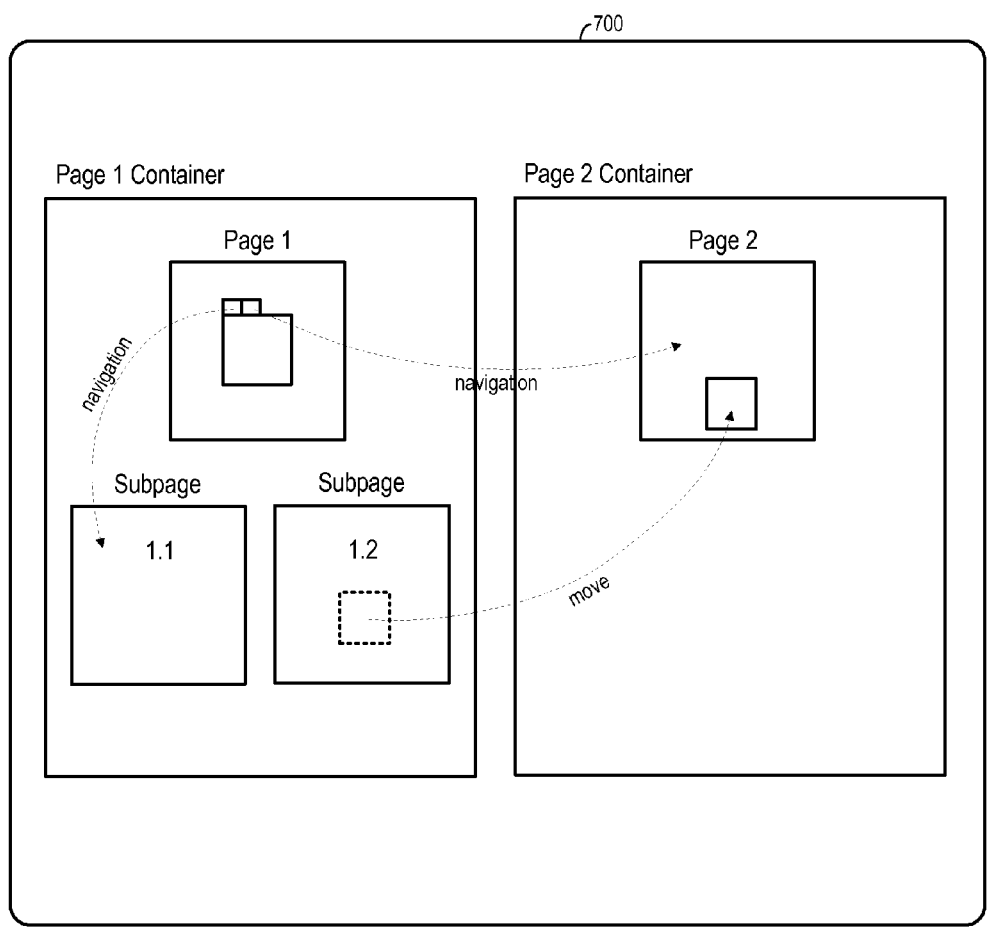
FIG. 8 is a view of a user interface of an authoring application according to some embodiments.

FIG. 8 depicts possible manipulations of interface 700 according to some embodiments. As shown, a navigation link is established between one tab of the Page 1 component and subpage 1.1, and another navigation link is established between the second tab of the Page 1 component and Page 2. Additionally, the component of subpage 1.2 is moved to Page 2. As described with respect to FIG. 5, some embodiments allow copying of components between pages. Again, all of the manipulations depicted in FIG. 8 may be represented by subsequently-generated metadata 118.

Figure 9:
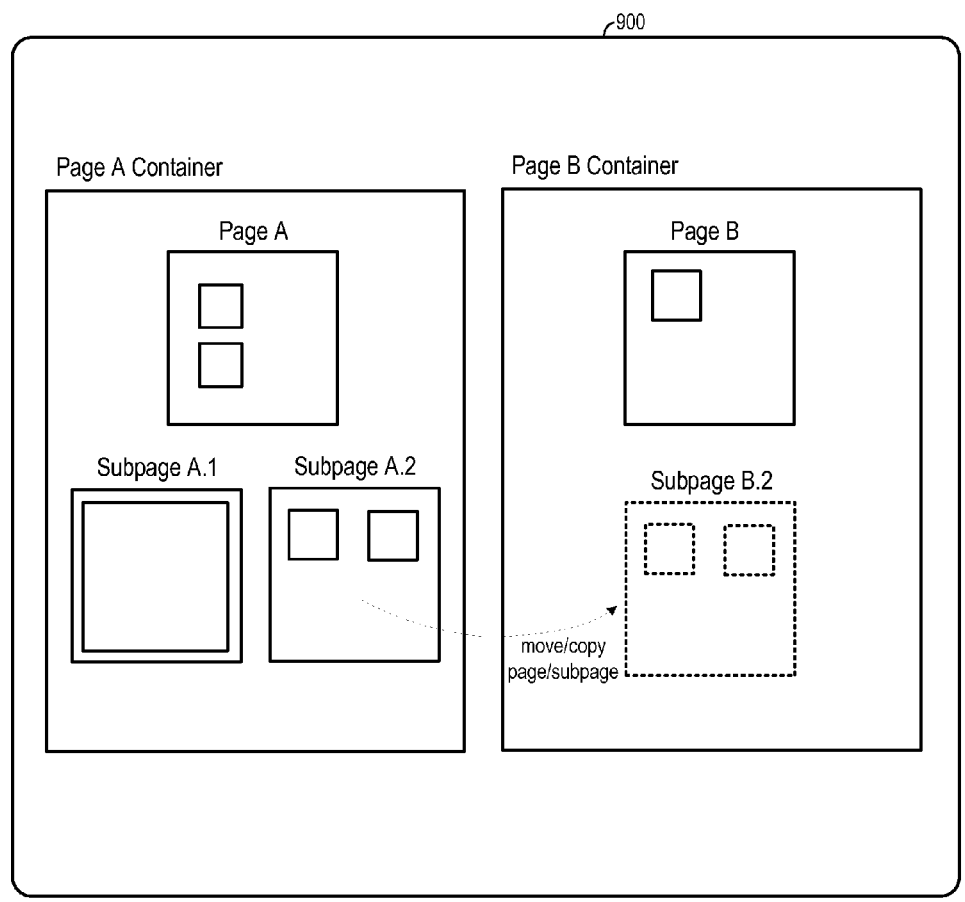
FIG. 9 is a view of a user interface of an authoring application according to some embodiments.

FIG. 9 illustrates interface 900 according to some embodiments. Interface 900 includes two containers, each representing a Web page and sub-pages thereof. As illustrated, a developer may input a gesture or command to move or copy a page or a subpage from one page to another. According to some embodiments, such moving/copying results in moving/copying both the page/sub-page and all of its components. This action creates metadata associated with each page and involved component. Any previously-created metadata for each involved component (e.g., navigation links, subscriptions) may be moved/copied as well. As a result, the moved/copied components may maintain their previously-established characteristics.

Figure 10:
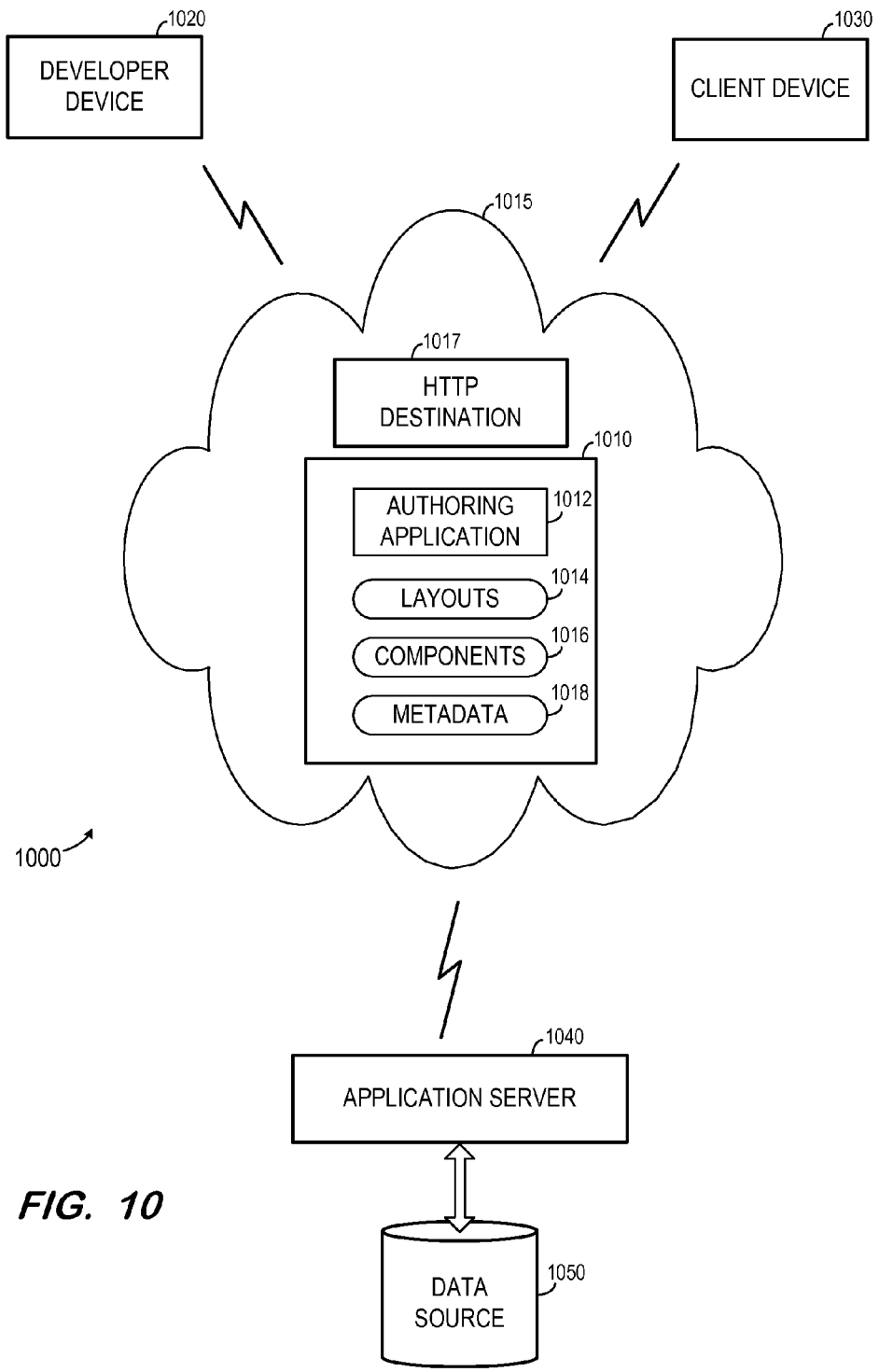
FIG. 10 illustrates a computing environment according to some embodiments.

FIG. 10 illustrates architecture 1000 according to some embodiments. Architecture 1000 includes cloud 1015 comprising server 1010 and HTTP destination 1017. Developer device 1020 may operate as described herein to access authoring application 1012 through HTTP destination 1017.

Client device 1030 may comprise a desktop computer, a laptop computer, a netbook computer, a tablet computer, a smartphone, and/or any other computing system that is or becomes known. Client device 1030 may use a URL of HTTP destination 1017 to access a website created as described herein. Such a website may consist of Web pages generated using the data of layouts 1014, components 1016 and metadata 1018.

The website may comprise a portal to access functionality of application server 1040. Application server 1040 may provide data of data source 1050 to client system 1030 via the portal. For example, application server 1040 may execute an application to receive a request from server 1010 based on an HTTP request from client device 1030, to query data source 1050 for data required by the request, to receive the data from data source 1050, perform any necessarily calculations on the data, and provide the report to client system 1030 via a Web page.

The data of data source 1050 may reside in a physical database or stored in-memory (e.g., in Random Access Memory). The data may comprise a relational database, an in-memory database, a multi-dimensional database, an eXtendable Markup Language (XML) document, and/or any other structured data storage system. The physical tables of data source 1050 may be distributed among several relational databases, dimensional databases, and/or other data sources. To provide economies of scale, data source 1050 may include data of more than one enterprise. Moreover, the data of data source 1050 may be indexed and/or selectively replicated in an index to allow fast retrieval thereof.

Figure 11:
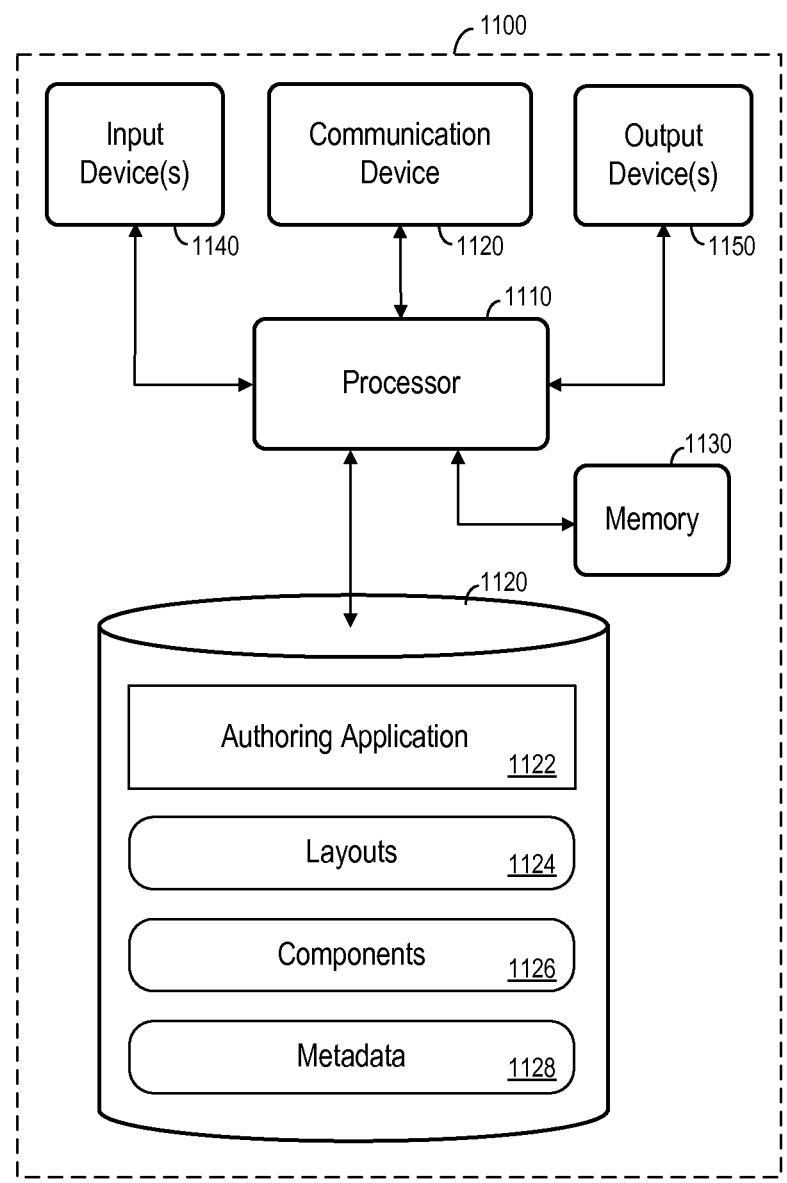
FIG. 11 is a block diagram of a computing system according to some embodiments.

FIG. 11 is a block diagram of apparatus 1100 according to some embodiments. Apparatus 1100 may comprise a general-purpose computing apparatus and may execute program code to perform any of the functions described herein. Apparatus 1100 may comprise an implementation of server 110 and/or server 1010. Apparatus 1100 may include other unshown elements according to some embodiments.

Apparatus 1100 includes processor 1110 operatively coupled to communication device 1120, data storage device 1130, one or more input devices 1140, one or more output devices 1150 and memory 1160. Communication device 1120 may facilitate communication with external devices, such as application server 110. Input device(s) 1140 may comprise, for example, a keyboard, a keypad, a mouse or other pointing device, a microphone, knob or a switch, an infra-red (IR) port, a docking station, and/or a touch screen. Input device(s) 1140 may be used, for example, to manipulate graphical user interfaces and to input information into apparatus 1100. Output device(s) 1150 may comprise, for example, a display (e.g., a display screen) a speaker, and/or a printer.

Data storage device 1130 may comprise any device, including combinations of magnetic storage devices (e.g., magnetic tape, hard disk drives and flash memory), optical storage devices, Read Only Memory (ROM) devices, etc., while memory 1160 may comprise Random Access Memory (RAM).

Authoring application 1132 of data storage device 1130 may comprise program code executable by processor 1110 to provide any of the functions described herein. Embodiments are not limited to execution of these functions by a single application. Layouts 1124, components 1126 and metadata 1128 may store information as described herein in any suitable format. Some or all of this information may also or alternatively be stored in memory 1160. Data storage device 1130 may also store data and other program code for providing additional functionality and/or which are necessary for operation thereof, such as device drivers, operating system files, etc.

Other topologies may be used in conjunction with other embodiments. Moreover, each system described herein may be implemented by any number of computing devices in communication with one another via any number of other public and/or private networks. Two or more of such computing devices of may be located remote from one another and may communicate with one another via any known manner of network(s) and/or a dedicated connection. Each computing device may comprise any number of hardware and/or software elements suitable to provide the functions described herein as well as any other functions. For example, any computing device used in an implementation of systems 100 or 1000 may include a processor to execute program code such that the computing device operates as described herein.

All systems and processes discussed herein may be embodied in program code stored on one or more computer-readable non-transitory media. Such media non-transitory media may include, for example, a fixed disk, a floppy disk, a CD-ROM, a DVD-ROM, a Flash drive, magnetic tape, and solid state RAM or ROM storage units. Embodiments are therefore not limited to any specific combination of hardware and software.

Embodiments have been described herein solely for the purpose of illustration. Persons in the art will recognize from this description that embodiments are not limited to those described, but may be practiced with modifications and alterations.

What is claimed is:

1. A system comprising:
a display;
a memory storing program code;
a processor to execute the program code to perform:
displaying on the display in a first region of a first graphical interface, a graphical representation of a first page of a website, the graphical representation of the first page of the website including a graphical representation of a first page component;
displaying on the display in a second region of the first graphical interface, a graphical representation of a second page of the website, the graphical representation of the second page of the website including a graphical representation of a second page component;
receiving, from an input device, a command to display a graphical indication of a navigation link between the first page component and the second page component; and
generating metadata defining the navigation link, wherein the metadata is configured to provide navigation between the first page component and the second page component when the website is displayed by a web browser running on a computer.

2. A system according to claim 1, the processor to further execute the program code to cause the display device to display:
in the first graphical interface, a graphical indication of a data subscription between the first page component and the second page component.

3. A system according to claim 1, the processor to further execute the program code to cause the display device to display:
in the first region, a graphical indication of a ranking of the first page component, and,
in the second region, a graphical indication of a ranking of the second page component.

4. A system according to claim 1, the processor to execute the program code to:
receive a command to sort the first page and the second page according to a characteristic; and
in response to the command, to cause the display device to display the graphical representation of the first page in the second region and to display the graphical representation of the second page in the first region.

5. A system according to claim 1, the processor to execute the program code to:
receive a command to add a page to the website; and
in response to the command, to cause the display device to display, in a third region of the first graphical interface, a graphical representation of a third page of the website.

6. A system according to claim 1, the processor to execute the program code to:
receive a command to copy the first component to another page;
in response to the command, to cause the display device to display, in the graphical representation of said another page, a graphical representation of the first component; and
in response to the command, to store metadata in association with said another page indicating the first component is executed when said another page is displayed by the web browser.

7. A system according to claim 1, the processor to execute the program code to:
receive a command to move the first component to the second page; and
in response to the command, to cause the display device to display, in the graphical representation of a second page of the website, a graphical representation of the first component, and to remove the graphical representation of the first component from the graphical representation of the first page of the website.

8. A system according to claim 1, wherein the first page component and the second page component each comprise code which provides web page functionality.

9. A non-transitory computer-readable medium storing processor-executable program code, the program code executable by a processor of a device to cause the device to:
display on a display, in a first region of a first graphical interface, a graphical representation of a first page of a website, the graphical representation of the first page of the website including a graphical representation of a first page component;

display on the display, in a second region of the first graphical interface, a graphical representation of a second page of the website, the graphical representation of the second page of the website including a graphical representation of a second page component;

receive, from an input device, a command to display a graphical indication of a navigation link between the first page component and the second page component; and generate metadata defining the navigation link, wherein the metadata is configured to provide navigation between the first page component and the second page component when the website is displayed by a web browser running on a computer.

10. A non-transitory computer-readable medium according to claim 9, the program code further executable by a processor of a device to cause the device to:

display, in the first graphical interface, a graphical indication of a data subscription between the first page component and the second page component.

11. A non-transitory computer-readable medium according to claim 9, the program code further executable by a processor of a device to cause the device to:

display, in the first region, a graphical indication of a ranking of the first page component, and, display, in the second region, a graphical indication of a ranking of the second page component.

12. A non-transitory computer-readable medium according to claim 9, the program code further executable by a processor of a device to cause the device to:

receive a command to sort the first page and the second page according to a characteristic; and in response to the command, display the graphical representation of the first page in the second region and to display the graphical representation of the second page in the first region.

13. A non-transitory computer-readable medium according to claim 9, the program code further executable by a processor of a device to cause the device to:

receive a command to add a page to the website; and in response to the command, display, in a third region of the first graphical interface, a graphical representation of a third page of the website.

14. A non-transitory computer-readable medium according to claim 9, the program code further executable by a processor of a device to cause the device to:

receive a command to copy the first component to another page;

in response to the command, display, in the graphical representation of said another page, a graphical representation of the first component; and in response to the command, store metadata in association with said another page indicating the first component is executed when said another page is displayed by the web browser.

15. A non-transitory computer-readable medium according to claim 9, the program code further executable by a processor of a device to cause the device to:

receive a command to move the first component to the second page; and in response to the command, display, in the graphical representation of a second page of the website, a graphical representation of the first component, and remove the graphical representation of the first component from the graphical representation of the first page of the website.

16. A non-transitory computer-readable medium according to claim 9, wherein the first page component and the second page component each comprise code which provides web page functionality.

17. A method implemented by a device executing program code, the method comprising:

display on a display, in a first region of a first graphical interface, a graphical representation of a first page of a website, the graphical representation of the first page of the web site including a graphical representation of a first page component;

display on the display, in a second region of the first graphical interface, a graphical representation of a second page of the website, the graphical representation of the second page of the website including a graphical representation of a second page component;

receive, from an input device, a command to display a graphical indication of a navigation link between the first page component and the second page component;

generate metadata defining the navigation link, wherein the metadata is configured to provide navigation between the first page component and the second page component when the website is displayed by a web browser running on a computer;

receive a command to sort the first page and the second page according to a characteristic; and in response to the command, display the graphical representation of the first page in the second region and to display the graphical representation of the second page in the first region.

18. A method according to claim 17, further comprising:

displaying, in the first graphical interface, a graphical indication of a data subscription between the first page component and the second page component.

19. A method according to claim 17, further comprising:

displaying, in the first region, a graphical indication of a ranking of the first page component, and, displaying, in the second region, a graphical indication of a ranking of the second page component.

20. A method according to claim 17, further comprising:

receiving a command to add a page to the website; and in response to the command, displaying, in a third region of the first graphical interface, a graphical representation of a third page of the website.

21. A method according to claim 17, further comprising:

receiving a command to copy the first component to another page;

in response to the command, displaying, in the graphical representation of said another page, a graphical representation of the first component; and in response to the command, storing metadata in association with said another page indicating the first component is executed when said another page is displayed by the web browser.

22. A method according to claim 17, further comprising:

receiving a command to move the first component to the second page; and in response to the command, displaying, in the graphical representation of a second page of the website, a graphical representation of the first component, and remove the graphical representation of the first component from the graphical representation of the first page of the website.

23. A method according to claim 17, wherein the first page component and the second page component each comprise code which provides web page functionality.

\* \* \* \* \*